Patented Mar. 4, 1941

2,234,063

UNITED STATES PATENT OFFICE 2,234,063

PROCESS FOR PRODUCING CONCENTRATED INFUSIONS FROM MEDICINAL PLANTS

John B. Rolle, Chicago, Ill.

No Drawing. Application April 7, 1939,
Serial No. 266,679

8 Claims. (Cl. 99—78)

The invention pertains to medicinal plants as distinguished from food plants such as vegetables commonly used as foods, and by the term medicinal plants as used herein is meant that general class of plants having little or no food value, but useful in infusion form as beverages having tonic, exhilarating, sedative, relaxing or other therapeutic effects, whether distinctly curative or not.

The invention is effective with different parts of the medicinal plants treated, for example, the leaves, flowers, roots, fruits, seeds and bark, depending upon the particular plant treated in any case and the nature of the infusion desired, and it is applicable in any case where a concentrated infusion of the plant is desired, containing the essential oil and active principle of the part of the plant that is treated, and particularly where it is desired to practically eliminate the bitter tannin principle that may be contained in the treated part of the plant.

As illustrations of the applicability of the invention, it may effectively be used to produce infusions of plant leaves, as for example, leaves of tea plants, leaves of ilex or maté plants, and leaves of wintergreen plants; also infusions of plant roots, as for example, roots of sarsaparilla plants and roots of ginger plants; also infusions of plant barks, as for example, bark of cinnamon plants and bark of sassafras plants; also infusions of flowers of plants, as for example, flowers of clove plants, flowers of camomile plants, and flowers of nutmeg plants; also infusions of fruits of plants, as for example, berries of juniper plants. Many other plants within the classification above generally defined, are equally as susceptible of having their parts similarly treated by the present invention.

The plants or parts thereof that are susceptible of treatment by the present invention, are usually in dried form before being so treated, principally because the plants or plant parts are generally available for treatment only in that form. It will be understood that the invention is equally applicable to the plants and plant parts before they are dried for storage and shipment, if they are available for treatment in undried condition.

In general, the process of the invention consists of first making an infusion extract of the plant part, and then, using the extract as a solvent, making a concentrated infusion of the plant part in such a manner, that the product contains a large percentage of the essential oil and also of the aroma and flavor of the plant part, and that the product contains the medicinal or therapeutic organic principle of the plant part in much stronger or more concentrated condition than can be the case where it is attempted to produce a solution of the plant part by steeping with water in the usual manner; further, said concentrated infusion contains a large percentage of the mineral salts originally present in the plant part treated, the bitter tannin principle is much less in the concentrated infusion than it is in a solution made by simply steeping the plant part in water, the concentrated solution is substantially free from solid matter and from matter that will precipitate with lapse of time, and the concentrated infusion is sterile and stable and will not deteriorate.

In making the infusion extract referred to, a measured quantity of the plant part, for example, one pound, is placed in a still connected with a coil or other condensing means. A measured quantity, for example, from three quarters of a pint to one and one half pints of a fixed oil, such as corn oil, olive oil, linseed oil or cottonseed oil, is placed in the still, and then a measured quantity of water, for example, from two to three gallons, is added, and the still is tightly closed excepting for its outlet connection with the condensing means employed. There is considerable variation in the quantity of water required for securing the best results, relatively to the quantity of the plant part employed, depending upon the strength of the essential oil, of the medicinal or therapeutic principle, and of the bitter tannin principle in the plant part employed, the stronger the plant part is in said respects, the greater being the amount of water required. The amount of fixed oil required for securing the best results, is usually proportional to the amount of water required, generally in substantially the proportion of one pint of fixed oil to two and one-half gallons of water. It will be understood that any desired multiples of the quantities referred to of the starting substances, may be employed, if preferred. It will also be understood that the plant part employed in each part of the process, should be in clean condition free from foreign matter, and that where the plant part is in solid condition, for example, plant bark or plant roots, it is desirable to subdivide, macerate, break or bruise the same, to effect intimate contact between the liquids employed and a large surface of the plant part used.

After placing the starting substances in the still as described, the still is first heated to about 100° F., and then, for the quantities named of the starting substances, the heating of the still is gradually increased to about 240° F. in about one hour. The contents of the still are then maintained at about 240° F. until the quantity of the condensate is, for the quantities named of the starting substances, about one gallon, or a correspondingly greater amount if larger quantities of the starting substances are used.

The condensate recovered by the condensing means, is the infusion extract, which is used in the subsequent part of the process, in making the concentrated infusion of the invention.

In the first part of the process by which the infusion extract is produced, the temperature in the still is purposely kept just below the temperature required to boil the liquid in the still, and this and the time of treatment result in passing into solution in the still, the more readily volatile and soluble constituents of the treated plant part without removing from the plant part its less volatile and soluble and undesirable constituents. The first part of the process may therefore properly be regarded as the fractional extraction of the volatile and soluble constituents of the treated plant part, by infusion, accompanied by the fractional distillation of the solution so produced.

The fixed oil in the still has several most important functions, as follows: First, it has affinity for and promptly combines with the essential oil drawn from the treated plant part by the heat in the still, so that all of the extracted essential oil is held in solution instead of being volatilized in uncombined form with the attendant probable loss of a considerable part of it. This, due to the stability of the fixed oil, holds the relatively unstable essential oil in stable and unchanged condition and against loss throughout the process and for a long time in the concentrated infusion resulting from the process as a whole. Second, due probably to its intimate association and blending or mixing with the essential oil, the fixed oil intimately blends or mixes with, or dissolves in the water in the still, thereby carrying the fixed oil into every part of the still and of the treated plant part, engaged and penetrated by the water, with the result that the fixed oil is present at every wet surface and crevice of the treated plant part, ready for immediate and intimate combination with each particle of the essential oil when and as the same is extracted from the treated plant part. The exact nature of the action of the fixed oil, the essential oil and the water upon each other, and the exact nature of the resulting mixture or solution, are not known or understood. It is known, however, that although the fixed oil has a boiling temperature very much higher than any temperature reached in the still, and although the fixed oil does not appreciably volatilize below its boiling temperature, only traces of the fixed oil as such, can be found after the making of the infusion extract, either in said extract or in the mixture left in the still, and practically all of said fixed oil as such, seems to have disappeared. Third, the plant parts above defined as the subject matter of the present process, generally contain albuminous and gummy substances which mix with the water in the still and form mucilaginous bubbles by the action of the volatilization in the still, which bubbles unless prevented from doing so, expand and carry over with the vapor into the condensing means, and in so doing carry oily and dirty matter into the condensate. The fixed oil changes this, and prevents the carrying over of the bubbles into the condensate, and so prevents the carrying over into the condensate, of foreign matter which is not desired in the condensate.

In producing the concentrated infusion, a measured and new quantity of the plant part used in making the infusion extract, for example, one pound, is placed in a suitable vessel, a measured quantity of the infusion extract, for example, a gallon or substantially so at approximately 60° F., is added, the vessel is tightly covered and allowed to stand for from 2½ hours to 3½ hours at a temperature which may rise to about 105° F. During this treatment, the plant part treated is saturated with the infusion extract employed, and at a temperature sufficiently low so that the bitter tannin principle of the treated plant part is not appreciably absorbed by the infusion extract, although the absorption of the essential oil and the medicinal or therapeutic organic principle and of the mineral salts of the treated plant part, does proceed actively before the absorption of much of the bitter tannin principle occurs, the affinity of like substances in the infusion extract and in the treated plant part appearing to have much to do with the effective absorption of the desired substances from the treated plant part. The plant parts generally which are the treated substances of this invention, contain the bitter tannin principle to a greater or lesser degree, and this step of treatment may be called the control of the amount of that principle absorbed by or transferred to the infusion concentrate. In some cases an appreciable amount of the bitter tannin principle in the infusion concentrate, may not be objectionable, or may even be desired. In such cases, the temperature of 105° F. above stated, may be increased to a maximum of about 190° F., the quantity of the bitter tannin principle communicated to the infusion concentrate in any such case being substantially proportional to the time of treatment and also to the temperature. Where the amount of the bitter tannin principle contained in the treated plant part is relatively large, the amount of said principle communicated to the infusion concentrate may be kept relatively low by keeping the temperature thereof relatively low, or by shortening the time of this step of treatment, or both; and where an appreciable quantity of that principle in the infusion concentrate is not objectionable, or is desired, the temperature of the mixture during the latter part of this step of treatment, may be nearly or quite the maximum temperature of 190° F. above prescribed, and the treatment may be timed accordingly.

At the end of the infusion period last described, the contents of the vessel containing the concentrated infusion, are strained, for example, through several thicknesses of cheesecloth to separate the concentrated liquid from the solid treated plant part and to remove all particles of solid matter from the liquid. The strained concentrated infusion is then cooled to from 34° F. to 40° F. and held at that temperature for from 10 to 15 hours, to precipitate any gummy and mucilagenous matter that may remain in the infusion after the straining. It is important that this operation be continued long enough to precipitate substantially all of said gummy and mucilagenous matter, and a longer period of precipitating treatment than that described, will do no harm. The gummy material in the infusion, during the making of the concentrated infusion, mixes or combines with a considerable part of the bitter tannin principle therein, as a result of which said mixed or combined gummy material and bitter tannin principle, are thrown down from the infusion by the precipitating action just described.

After the precipitating operation, the concentrated infusion is thoroughly filtered, for example, through canton flannel, and the filtered liquid is the concentrated infusion of the treated plant part in cleared and cleaned condition.

In preparing the cleaned and concentrated infusion for commerce, it is heated to about 190° F. and then at once placed in cans or equivalent receptacles to fill the same and the containers are at once hermetically sealed. Thereupon the sealed containers are placed in a retort or oven and heated to a temperature of about 250° F., and held at that temperature for a period of about 15 minutes, to sterilize the concentrated infusion. The containers are then cooled to room temperature and the concentrated infusion is ready for shipment, sale, storage or use, and will keep in unchanged condition for a long period of time.

The concentrated infusion thus produced, contains the essential oil and active medicinal or therapeutic principle of the treated plant part in many times the strength resulting from making an infusion or so called "tea" of the plant part by the ordinary method of steeping, and yet, if desired, the bitter tannin principle is present to so small an extent in the concentrated infusion as to not be noticeable or objectionable.

The concentrated infusion resulting from the process described, as well as said process, constitutes the subject of the present invention. Said concentrated infusion may be diluted for use, with many times its bulk of water, either hot or cold as preferred, and is in that condition useful for any purpose, whether beverage or otherwise, for which an infusion or so called "tea" of the same plant part could be used, with the elimination of the objectionable bitter tannin principle that is present in said infusion or "tea" as heretofore made; and the essential oil and characteristic principle and aroma of the plant part are preserved in much greater degree and without loss or modification in the diluted infusion or "tea" in a manner not possible in methods heretofore employed in making said infusion or "tea" from the plant part whether by steeping, soaking, boiling or otherwise. The degree of dilution employed in making the infusion or "tea" from the concentrated infusion of the invention, depends on the purpose for which the infusion or "tea" is to be used, and the strength as to the distinctive characteristics of the treated plant part, that the infusion or "tea" is desired to have.

To specifically illustrate the process and resulting product, the production of tea concentrate for beverage purposes, from leaves of the tea plant, is now described. The tea leaves employed, are assumed to be in the condition in which they are sold for domestic use, that is to say, after they have been picked from the tea plants, sorted, cured and packed for sale by the tea processor or manufacturer. The brand or kind of cured tea leaves employed in the process of the invention, is immaterial, being determined by the flavor desired in the resulting tea concentrate. It should be noted, however, that by the process, the tea concentrate resulting from the cheaper grades of tea leaves, is, when diluted for beverage purposes, equal or superior to tea beverage produced in the usual manner in the home from much more expensive grades of the same class of tea leaves, because of the elimination by the process of the invention, of so much of the bitter tannin principle from the resulting concentrate, that it is not appreciable in the diluted tea concentrate when used as a beverage.

The extract of the tea leaves is prepared by placing in a still at a temperature of not over 100° F., one pound of the tea leaves, one pint of a fixed oil, for example, corn oil, and two and one-half gallons of water; the still is then gradually heated so that the temperature of its contents is increased to about 240° F. in about one hour, and that temperature is maintained until the amount of condensate is about one gallon. The condensate is the extract of the tea leaves. The material remaining in the still is waste and is discarded.

The starting temperature of 100° F. should not be exceeded, to insure a substantial interval in which the tea leaves may be thoroughly soaked with the liquids employed, before there is any perceptible transfer of the characteristic principles of the tea leaves into the liquids employed. The terminal temperature of about 240° F. should not be exceeded, unless it is certain that the terminal temperature is not as high as the boiling temperature of the mixture in the still. The treating temperature should be kept sufficiently below said boiling temperature, to insure that the transfer operation is by infusion as distinguished from boiling, since it is found in practice that the desirable results of the process can only be produced by infusion. During the treatment, the slow heating of the contents of the still, facilitates the combining of the water with the corn oil, so that the latter rapidly flows through or blends with all parts of the water and so enters all parts of the tea leaves into which the water has penetrated by the initial soaking action. The said blending of the water and corn oil proceeds progressively as the transfer from the tea leaves of their distinctive principles or characteristics is accelerated by the increasing temperature, and thus the corn oil is present over the entire surfaces and in all the crevices of the tea leaves and ready to immediately engage, combine with and retain the said distinctive principles or characteristics as rapidly as they are given up by the tea leaves. This affords no opportunity for said principles or characteristics, to be volatilized as such, and lost. The outstanding principles or characteristics of tea leaves, the things which give beverage tea its flavor and aroma, are the essential oil and theine. These combine at once with the water-blended corn oil upon being released from the tea leaves, and this union is apparently unbroken during the remainder of the process. As far as can be determined, the combined essential oil, corn oil and water, vaporize and condense without separation, because at the end of making the tea extract, only minute traces of the corn oil can be found either in the still or in the condensate. The treatment described is continued only until substantially the quantity of condensate described is produced, because in practice it is found that treatment to that extent of the tea leaves, extracts from them substantially all of their desirable characteristics, and that if the treatment is continued for a longer time, end products are produced and transferred into the solution, which are not desirable and which degrade the quality of the extract.

In making the concentrated tea infusion, one gallon of the tea extract prepared as described is mixed at a temperature of about 60° F. in a suitable vessel, with a new portion of one pound of cured tea leaves, preferably of the same brand or kind as used in making the extract, although this is not essential. The vessel is tightly covered and closed, and the mixture is permitted to stand for a period of about there hours at a temperature of not over about 105° F., during which time the extract serves to draw from the tea leaves, the essential oil, theine and mineral salts contained therein, thereby materially increasing the strength of the solution in the vessel. The length of treatment and the temperature determine the amount of the bitter tannin principle that is drawn from the tea leaves into the solution, which in any event is not large if the time of treatment and maximum temperature prescribed are not exceeded. The amount of the bitter tannin principle so extracted, may be kept to a desired small quantity, by a shorter time of treatment or a lower maximum temperature, or both, as above described.

The concentrated solution is then strained, cooled to precipitate its gummy and mucilagenous matter including a considerable part of the bitter tannin principle attaching to said matter, the solution is filtered and then heated and canned, sealed and sterilized, all as above described.

The filtered solution is the concentrated infusion of the tea leaves, and is found by analysis to contain ten times as much theine as beverage tea made in the ordinary way, and not over one-third of the bitter tannin principle commonly found in said beverage tea. Thus, for use, the concentrated infusion may be diluted with from nine to ten parts of hot water and form a beverage equally as strong in aroma, flavor and desirable theine properties as commonly-made beverage tea, and containing only an inappreciable, or a desired amount of the bitter tannin principle.

Multiples of the quantities of the starting substances may be used with either part of the process of preparing the concentrated infusion of the tea leaves. The quantities stated for the starting substances in either case, are not critical, and the proportions may be varied somewhat without materially changing the characteristics of the resulting concentrated infusion.

Where in the above description, amounts of the substances used are specified by weight, it will be understood that the avoirdupois system of weights is employed.

While I have described my process as including the steps of treatment particularly described, and the product as resulting from those particular steps of treatment, I do not limit myself specifically thereto, as I may employ equivalents thereof without departing from the scope of the appended claims.

What I claim is:

1. The process of making concentrated infusions of medicinal plant parts containing substantial amounts of the bitter tannin principle, consisting of mixing a first portion of the plant part, a fixed oil and water in substantially the proportions of one pound of the plant part, one pint of the fixed oil and from two to three gallons of water, placing the mixture in a still at a temperature of not to exceed substantially 100° F. and gradually increasing the temperature of the mixture in the still to not over 240° F. in about one hour and continuing the treatment in the still and the condensation of the distillate until the condensate amounts to substantially one gallon per pound of said plant part so treated, then mixing a second portion of the plant part and said condensate in substantially the proportion of one pound of the plant part and one gallon of said condensate at a temperature of not to exceed 60° F. and heating said mixture in a closed vessel to not to exceed 105° F. in from two to three hours, then straining the contents of said vessel, returning the strained liquid to said vessel and closing the same and cooling said liquid to from 34° to 40° F. and holding said liquid at that temperature for from ten to fifteen hours, and then filtering from said liquid the precipitate developed therein.

2. The process of making concentrated infusions of medicinal plant parts containing substantial amounts of the bitter tannin principle, consisting of mixing a first portion of the plant part with a fixed oil and water and extracting soluble portions of the plant part by infusion and separating the liquid extract by distillation, mixing the distillate with a second portion of the plant part and extracting soluble portions of the second portion of the plant part by infusion below the temperature of active extraction of the bitter tannin principle of the second portion of the plant part, and removing from the solution gummy and mucilagenous matter therein.

3. The process of making concentrated infusions of medicinal plant parts containing substantial amounts of the bitter tannin principle, consisting of mixing a first portion of the plant part with a fixed oil and water and extracting soluble portions of the plant part by infusion and separating the liquid extract by distillation, mixing the distillate with a second portion of the plant part and extracting soluble portions of the second portion of the plant part by infusion, and removing from the solution gummy and mucilagenous matter contained therein.

4. The process of making concentrated infusions of medicinal plant parts containing substantial amounts of the bitter tannin principle, consisting of making an infusion extract of a first portion of the plant part with water and a fixed oil and then treating a second portion of the plant part with said infusion extract and transferring to the infusion extract a relatively large part of the characteristic organic principle of the treated plant part and a relatively small part of the bitter tannin principle of the treated plant part.

5. The process of making a concentrated infusion of tea leaves, consisting of mixing a first portion of tea leaves, a fixed oil and water in substantially the proportions of one pound of the tea leaves, one pint of the fixed oil and from two to three gallons of water, at not over 100° F. and heating the mixture to a temperature not higher than the boiling temperature of the mixture in about one hour and during the treatment distilling off the volatile portions of the mixture and condensing the distillate and continuing the treatment until the condensate amounts to substantially one gallon per pound of the tea leaves so treated, then mixing a second portion of tea leaves with the condensate in substantially the proportion of one pound of tea leaves to one gallon of the condensate at a temperature of not to exceed 60° F. and heating said mixture in a closed vessel to not to exceed 105° F. in from two to three hours, then straining the contents of the vessel, returning the strained liquid to the vessel and closing the same and cooling said liquid to from 34° F. to 40° F. and holding said liquid at that temperature for from ten to fifteen hours, and then filtering from said liquid the precipitate developed therein.

6. The process of making a concentrated infusion of tea leaves, consisting of mixing a first portion of tea leaves with a fixed oil and water and extracting soluble portions of the tea leaves by infusion and separating the liquid extract by distillation, mixing the distillate with a second portion of tea leaves and extracting soluble portions of the second portion of tea leaves by infusion, and removing from the solution gummy and mucilagenous matter therein.

7. The process of making a concentrated infusion of tea leaves, consisting of mixing a first portion of tea leaves with a fixed oil and water and extracting soluble portions of the tea leaves by infusion and separating the liquid extract by distillation, mixing the distillate with a second portion of tea leaves and extracting soluble portions of the second portion of tea leaves by infusion below the temperature of active extraction of the bitter tannin principle of the second portion of tea leaves, and removing from the solution gummy and mucilagenous matter therein.

8. The process of making a concentrated infusion of tea leaves, consisting of making an infusion extract of a first portion of tea leaves with water and a fixed oil, and then treating a second portion of tea leaves with said infusion extract and transferring to the infusion extract a relatively large part of the theine of the treated tea leaves and a relatively small part of the bitter tannin principle of the treated tea leaves.

JOHN B. ROLLE.